United States Patent
Matsutani et al.

(10) Patent No.: US 8,089,226 B2
(45) Date of Patent: Jan. 3, 2012

(54) TORQUE CONTROL DEVICE AND METHOD FOR CONTROLLING THE SAME

(75) Inventors: Ryuta Matsutani, Kitakyushu (JP); Kenji Yoshida, Kitakyushu (JP); Shigeru Sakurai, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 263 days.

(21) Appl. No.: 12/605,373

(22) Filed: Oct. 26, 2009

(65) Prior Publication Data

US 2010/0039053 A1  Feb. 18, 2010

Related U.S. Application Data

(63) Continuation of application No. PCT/JP2008/060680, filed on Jun. 11, 2008.

(30) Foreign Application Priority Data

Jun. 26, 2007  (JP) ................................. 2007-167864

(51) Int. Cl.
*H02P 5/46* (2006.01)
(52) U.S. Cl. ............... 318/68; 318/34; 318/50; 318/105
(58) Field of Classification Search ................ 318/34, 318/68, 50, 105, 432, 430
See application file for complete search history.

(56) References Cited

U.S. PATENT DOCUMENTS

| 5,223,069 | A | * | 6/1993 | Tokuno et al. | ................. 156/351 |
| 5,359,154 | A | * | 10/1994 | Tsukasa et al. | ................. 177/145 |
| 5,361,852 | A |   | 11/1994 | Inoue et al. | |
| 7,893,636 | B2 | * | 2/2011 | Lantz et al. | .................... 318/105 |
| 2008/0314162 | A1 |   | 12/2008 | Inoue | |
| 2009/0108778 | A1 | * | 4/2009 | Lantz et al. | .................... 318/105 |
| 2009/0237026 | A1 | * | 9/2009 | Panaitescu et al. | ........... 318/630 |
| 2010/0188813 | A1 | * | 7/2010 | Nakatsu et al. | ................ 361/689 |
| 2011/0088523 | A1 | * | 4/2011 | Yamada | ......................... 82/1.11 |

FOREIGN PATENT DOCUMENTS

| EP | 0704780 | 4/1996 |
| JP | 06-182638 | 7/1994 |
| JP | 07-281721 | 10/1995 |
| JP | 10-080872 | 3/1998 |
| JP | 2005-88147 | 4/2005 |
| WO | WO 2007/099626 | 9/2007 |

\* cited by examiner

*Primary Examiner* — Paul Ip
(74) *Attorney, Agent, or Firm* — Ditthavong Mori & Steiner, P.C.

(57) ABSTRACT

A torque control device controlling torque of first and second mechanical units connected coaxially to each other through connecting members includes a controller generating first and second references from a command from a host system, first and second motors respectively driving the first and second mechanical units, first and second motor control units respectively controlling the first and second motors on the basis of the first and second references. The first and second references synchronously accelerate the first and second motors to first rotational speed, then increase rotational speed of the second motor according to a speed profile to produce torsional torque in the connecting members, decelerate the second motor to the first rotational speed after the torsional torque reaches a predetermined value, and synchronously decelerate and stop the first and second motors after a predetermined time period elapses.

20 Claims, 7 Drawing Sheets

Fig.4

| FIRST MOTOR | | CONNECTING PORTION | SECOND MOTOR | |
|---|---|---|---|---|
| MOMENT OF INERTIA OF MOTOR Jr1 | MOMENT OF INERTIA OF MECHANISM Jm1 | SPRING ks | MOMENT OF INERTIA OF MECHANISM Jm2 | MOMENT OF INERTIA OF MOTOR Jr1 |
| $J1 = Jr1 + Jm1$ | | $ks$ | $J2 = Jr2 + Jm2$ | |

TORQUE CONTROL DEVICE AND METHOD FOR CONTROLLING THE SAME

CROSS REFERENCE TO RELATED APPLICATION

The present application is related to PCT patent application Ser. No. PCT/JP2008/060680 titled "Torque Control Device, And Its Control Method", and to Japanese Patent application no. 2007-167864 filed at Japan Patent Office titled "Torque Control Device, And Its Control Method", all of which are incorporated herein by reference.

BACKGROUND OF THE INVENTION

1. Field of the Invention

The present invention relates to a torque control device applied to, for example, a screw tightening device and a method for controlling the same, the torque control device tightening connecting members by application of torsional torque.

2. Description of Related Art

It is an object of a known art, for example, Japanese Unexamined Patent Application Publication No. 10-080872, to reduce the overshoot of tightening torque.

A current limiting unit monitors the value of current supplied from a current amplifier to a motor and performs interrupt control of a current reference unit so that the value of current does not exceed a current limit value input to the current limiting unit from a general reference unit.

The current limit value in the current limiting unit is determined by $iL(t)=iT \cdot \exp\{-v(t)/K\}$, where $iL(t)$ is the current limit value at a time t, $iT$ is the value of current for producing target torque, $v(t)$ is motor rotational speed at the time t, and K is a constant.

The current limit value increases and decreases in response to the motor rotational speed. As a predetermined value of driving current corresponding to the target tightening torque is approached, the value of the driving current gradually increases, and thus the tightening torque also gradually increases, so that the tightening torque gradually reaches the target tightening torque without exceeding the target tightening torque. That is, a screw member is appropriately tightened with predetermined torque without the overshoot of the rotational torque of a motor. Thus, the overshoot of tightening torque can be reduced.

Moreover, for example, it is an object of Japanese Unexamined Patent Application Publication No. 6-182638 to improve the accuracy of screw tightening torque by preventing an actual torque value from being irregular, for example, sharply increasing, due to a change in friction between a screw and a workpiece, lost motion in a mechanical transmission system such as a motor shaft and a speed reducer, and the like.

A torque sensor that detects rotational torque is provided. The detected torque value is fed back, and a torque reference is output to a current driven driver so as to perform control so that motor rotational torque reaches a set torque value, and when the detected torque value reaches a target torque value, a current reference from the current driven driver is turned off to stop a motor.

SUMMARY OF THE INVENTION

A torque control device according to a first aspect of the present invention that controls torque of a first mechanical unit and a second mechanical unit connected coaxially to each other through connecting members is provided. The torque control device includes a controller that generates a first reference and a second reference on the basis of a command from a host system, a first motor that drives the first mechanical unit, a second motor that drives the second mechanical unit, a first motor control unit that controls the first motor on the basis of the first reference, and a second motor control unit that controls the second motor on the basis of the second reference. The first reference and the second reference synchronously accelerate the first motor and the second motor until first rotational speed is reached, then change rotational speed of the second motor according to a predetermined speed profile in which the rotational speed of the second motor is higher than the first rotational speed to produce torsional torque in the connecting members, decelerate the second motor to the first rotational speed after the torsional torque reaches a predetermined value, and synchronously decelerate and stop the first motor and the second motor after a predetermined time period elapses.

A torque control device according to a second aspect of the present invention that controls torque of a first mechanical unit and a second mechanical unit connected coaxially to each other through connecting members is provided. The torque control device includes a controller that generates a first reference and a second reference on the basis of a command from a host system, a first motor that drives the first mechanical unit, a second motor that drives the second mechanical unit, a first motor control unit that controls the first motor on the basis of the first reference, and a second motor control unit that controls the second motor on the basis of the second reference. The first reference and the second reference synchronously accelerate the first motor and the second motor until first rotational speed is reached, then increase rotational speed of the second motor to second rotational speed that is higher than the first rotational speed to produce torsional torque in the connecting members, decelerate the second motor to third rotational speed that is equal to or more than the first rotational speed and less than the second rotational speed after the torsional torque reaches first torque, decelerate the second motor to fourth rotational speed that is equal to or more than the first rotational speed and less than the third rotational speed after the torsional torque reaches second torque, decelerate the second motor to the first rotational speed after the torsional torque reaches third torque, and synchronously decelerate and stop the first motor and the second motor after a predetermined time period elapses.

A torque control device according to a third aspect of the present invention that controls torque of a first mechanical unit and a second mechanical unit connected coaxially to each other through connecting members is provided. The torque control device includes a controller that generates a first reference and a second reference on the basis of a command from a host system, a first motor that drives the first mechanical unit, a second motor that drives the second mechanical unit, a first motor control unit that controls the first motor on the basis of the first reference, and a second motor control unit that controls the second motor on the basis of the second reference. The first reference and the second reference synchronously accelerate the first motor and the second motor until first rotational speed is reached, then produce torsional torque by changing motor phase difference between the first motor and the second motor according to a predetermined profile by increasing rotational speed of the second motor, change the motor phase difference according to the predetermined profile after the torsional torque reaches first torque, fix the motor phase difference after the torsional torque reaches third torque, and synchronously decelerate and stop the first motor and the second motor after a predetermined time period elapses.

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

Embodiments of the present invention will now be described with reference to the drawings.

Figure 1:
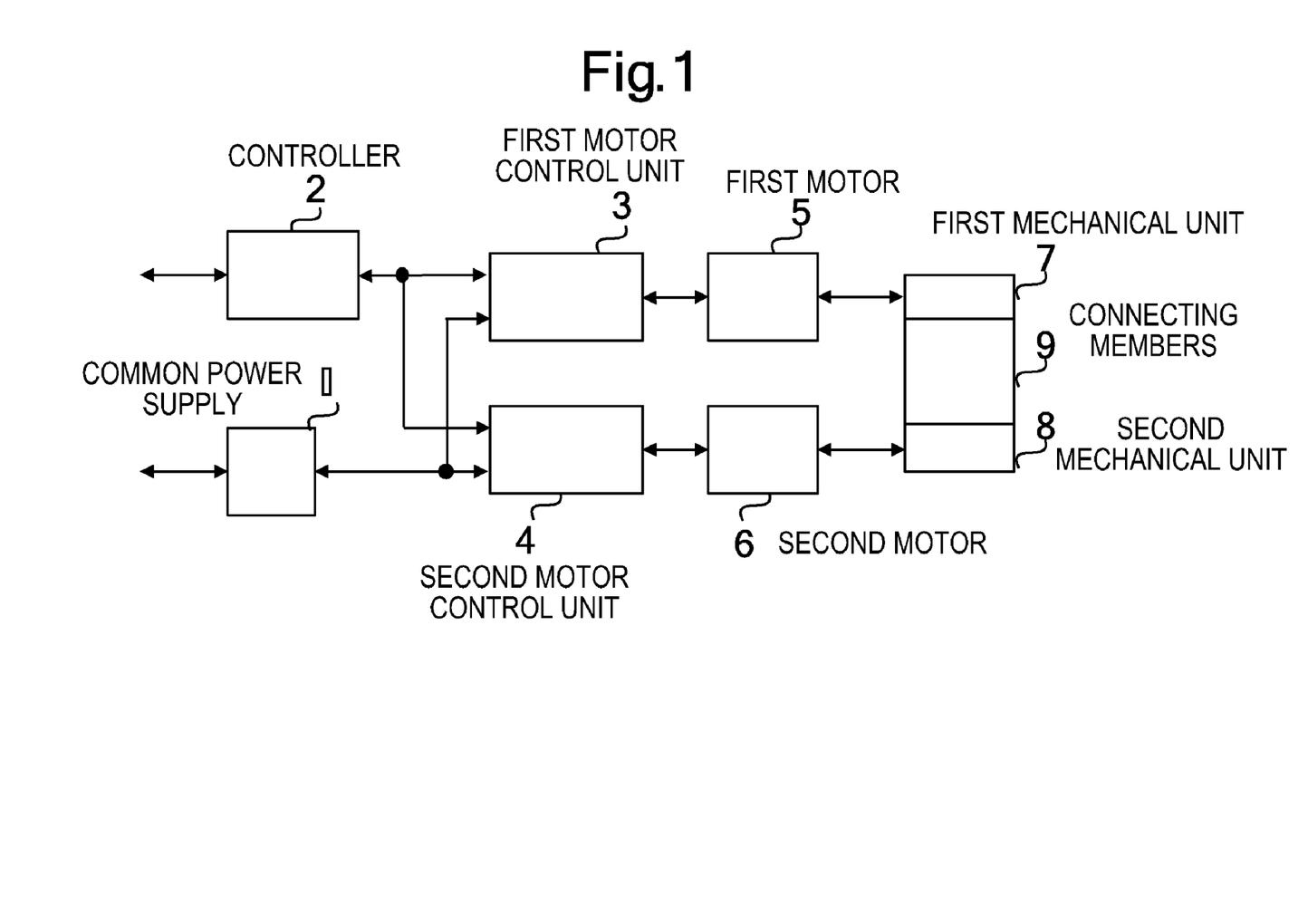
FIG. 1 is a block diagram showing a configuration of a torque control device according to the present invention.

FIG. 1 is a block diagram showing a configuration of a torque control device according to the present invention. The torque control device according to the present invention includes a common power supply 1, a controller 2, a first motor control unit 3, a second motor control unit 4, a first motor 5, a second motor 6, a first mechanical unit 7, a second mechanical unit 8, and connecting members 9.

The controller 2 generates a first reference and a second reference by executing stored programs according to a command from a host system.

The first motor control unit 3 controls the first motor 5 according to the first reference. The second motor control unit 4 controls the second motor 6 according to the second reference.

The first motor 5 drives the first mechanical unit 7. The second motor 6 drives the second mechanical unit 8. The connecting members 9 connect the first mechanical unit 7 to the second mechanical unit 8.

The common power supply 1 generates direct-current power by rectifying three-phase alternating-current power to supply electrical power to the first motor control unit 3 and the second motor control unit 4.

Moreover, the controller 2 includes a reference generation unit, a first communication unit, a second communication unit, and programs.

The first communication unit receives a command from the host system and sends a response.

The reference generation unit generates the first reference for the first motor control unit 3 and the second reference for the second motor control unit 4 on the basis of the stored programs and the command from the host system.

The second communication unit converts the first and second references to commands to send the commands to the first motor control unit 3 and the second motor control unit 4 and receives a response from each of the first motor control unit 3 and the second motor control unit 4.

Each of the first and second references generates a control mode reference that defines which of position control, speed control, and torque control a corresponding one of the first motor control unit 3 and the second motor control unit 4 performs, a position reference, an external speed reference, and an external torque reference.

Figure 2:
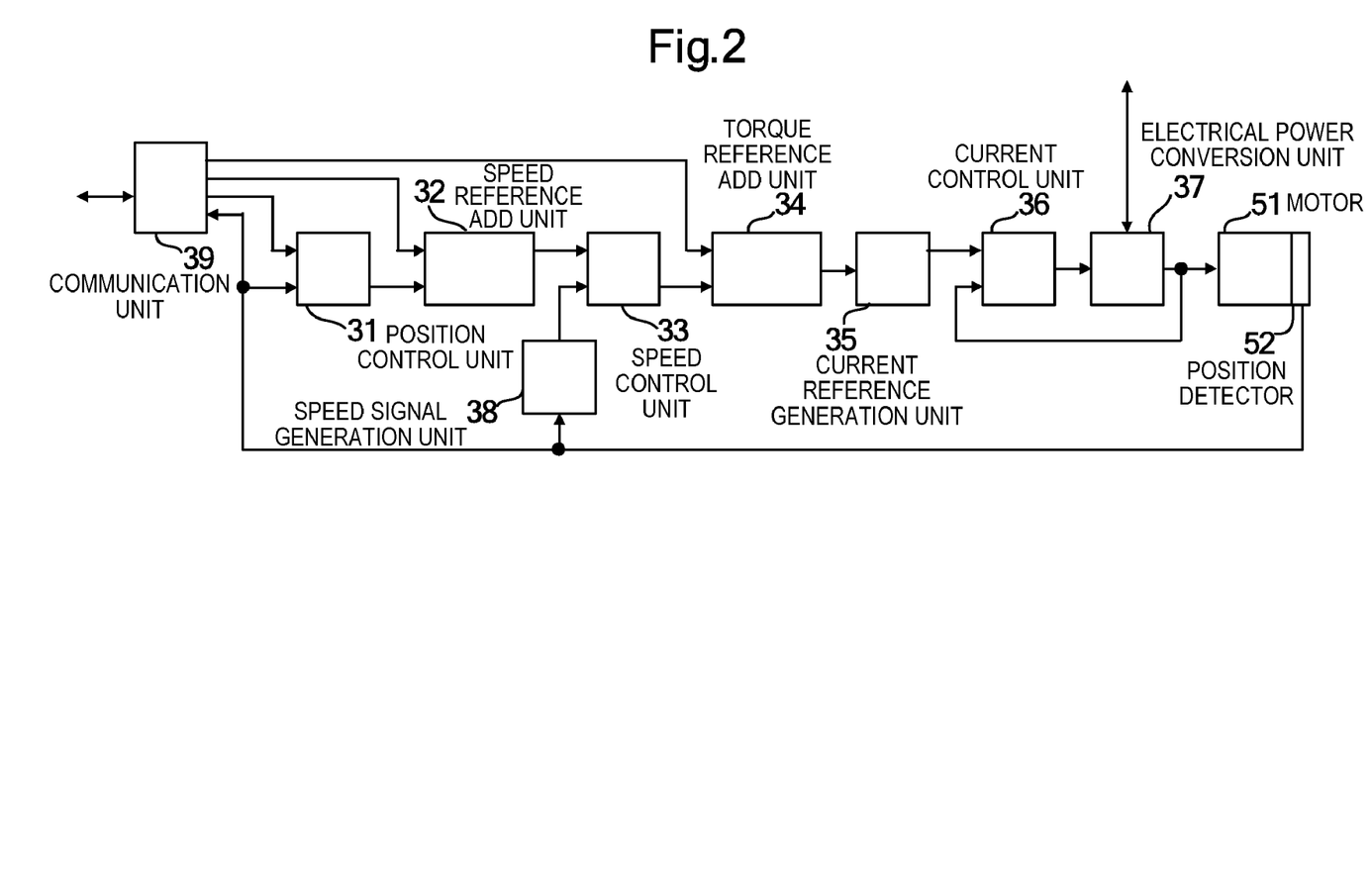
FIG. 2 is a block diagram showing a configuration of each of a first motor control unit and a second motor control unit in the torque control device according to the present invention.

FIG. 2 is a block diagram showing a configuration of each of the first motor control unit 3 and the second motor control unit 4 in the torque control device according to the present invention. Each of the first motor control unit 3 and the second motor control unit 4 includes a position control unit 31, a speed reference add unit 32, a speed control unit 33, a torque reference add unit 34, a current reference generation unit 35, a current control unit 36, an electrical power conversion unit 37, a speed signal generation unit 38, and a communication unit 39. Moreover, the first motor control unit 3 and the second motor control unit 4 drive a motor 51 that includes a position detector 52.

The communication unit 39 receives, using serial communication, a command generated by the controller 2 and sends the status of the motor control unit as a response. Position control, speed control, or torque control is selected on the basis of the control mode reference of the command. When position control is defined, the position control unit 31 generates a speed reference by performing a proportional-integral-derivative (PID) control operation on position variation that is the difference between the position reference and a position signal.

The speed reference add unit 32 generates a new speed reference by adding the speed reference to the external speed reference. The speed control unit 33 generates a torque reference by performing a PID control operation on speed variation that is the difference between the speed reference and a speed signal.

The torque reference add unit 34 generates a new torque reference by adding the torque reference to the external torque reference. The current reference unit 35 generates a current reference by dividing the torque reference by the torque constant of the motor 51. The current control unit 36 generates a voltage reference by performing a PID control operation on current variation that is the difference between the current reference and a current signal.

The electrical power conversion unit 37 generates a pulse-width modulation (PWM) signal from the voltage reference to drive an inverter (not shown). The inverter generates modulated voltage from direct-current voltage supplied from the common power supply 1, using the PWM signal, and applies the modulated voltage to the motor 51. The position detector 52 generates a position signal of the motor 51. The speed signal generation unit 38 generates a speed signal by obtaining the time difference of a position signal.

Figure 3:
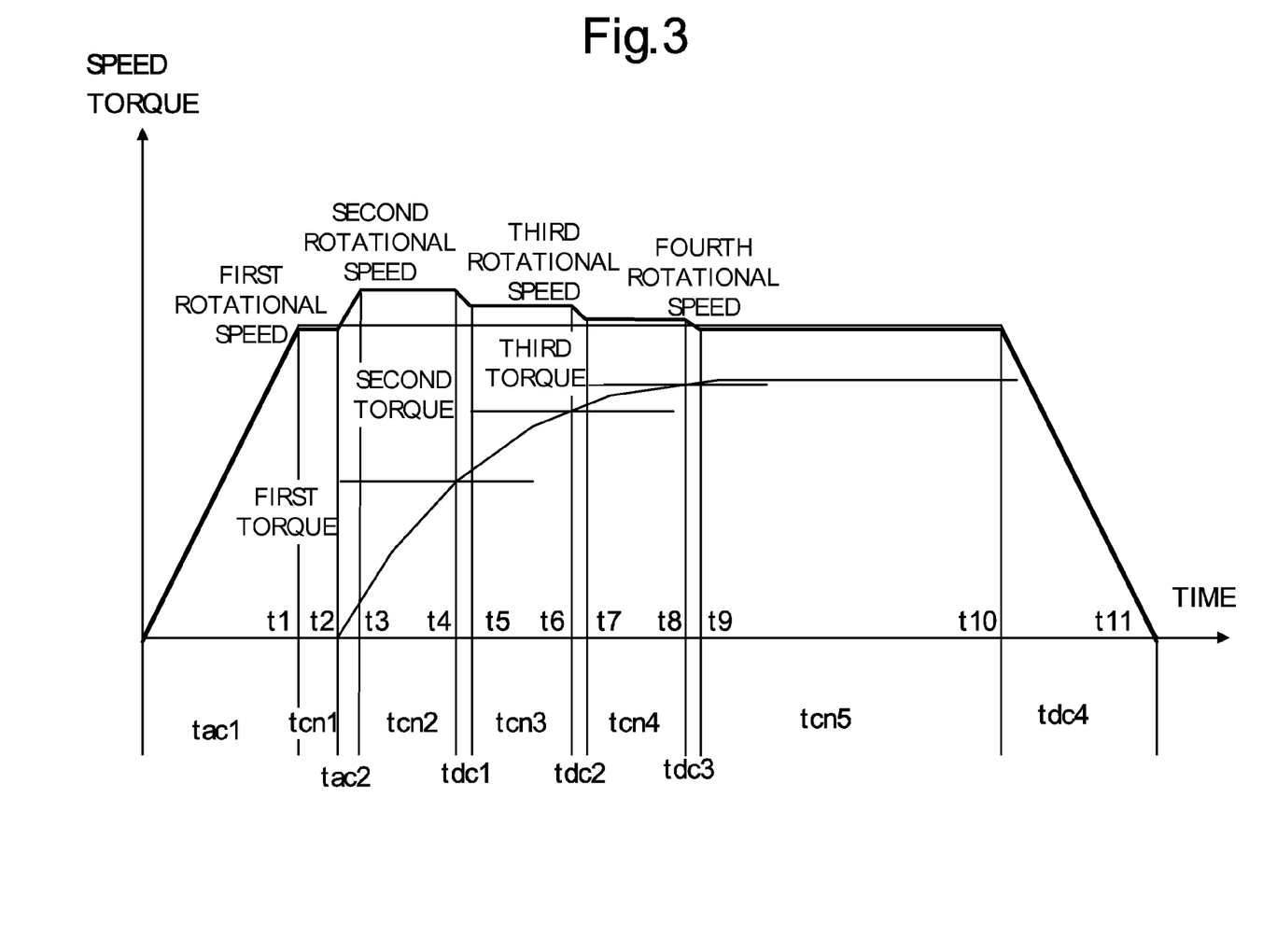
FIG. 3 is a time chart showing the speed profile of a position reference in the torque control device according to the present invention.

FIG. 3 is a time chart showing the speed profile of a position reference in the torque control device according to the present invention. The control mode is the position control mode.

In this time chart, in order to improve the accuracy of tightening torque by eliminating the influence of static friction torque in a state in which a nut and a bolt are rotated and tightening the bolt and the nut against each other with low relative rotational speed difference between the nut and the bolt, several revolutions per minute, the nut and the bolt in a state in which the bolt is screwed into the nut are first synchronously accelerated to predetermined rotational speed.

Subsequently, when the predetermined rotational speed is reached, the rotational speed of the nut or the bolt is increased to predetermined rotational speed to produce tightening torque between the nut and the bolt.

Subsequently, when the tightening torque reaches a predetermined value, the higher rotational speed is reduced in response to the torque to be synchronized with the initial rotational speed. Then, after a predetermined time period elapses, the rotational speed is reduced, so that the rotation is stopped.

Assuming that first rotational speed time is t, the first and second references accelerate the rotation to first rotational speed with acceleration α. When the first rotational speed is reached at a time t1, the first rotational speed is kept until a time t2.

At the time t2, only the second reference accelerates the rotation to second rotational speed with acceleration α. When the second rotational speed is reached at a time t3, the second rotational speed is kept.

When the torque reference reaches first torque at a time t4, the rotation is decelerated to third rotational speed with deceleration β. When the third rotational speed is reached at a time t5, the third rotational speed is kept.

When the torque reference reaches second torque at a time t6, the rotation is decelerated to fourth rotational speed with the deceleration β. When the fourth rotational speed is reached at a time t7, the fourth rotational speed is kept.

When the torque reference reaches third torque at a time t8, the rotation is decelerated to the first rotational speed with the deceleration β. When the first rotational speed is reached at a time t9, the first rotational speed is kept. After a predetermined time period elapses, the rotation is decelerated to be stopped.

In this case, since torsional torque is almost proportional to the phase difference between the first motor 5 and the second motor 6, instead of the speed profile, the profile of the phase difference between the first motor 5 and the second motor 6 may be used.

For example, the first motor 5 and the second motor 6 are first synchronously accelerated. When the first rotational speed is reached, torsional torque is produced by changing the phase difference between the first motor 5 and the second motor 6 according to a predetermined profile by setting the rotational speed of the second motor 6 higher than the first rotational speed.

Subsequently, when the torsional torque reaches the first torque, the phase difference between the first motor 5 and the second motor 6 is changed according to the predetermined profile.

Subsequently, when the third torque is reached, the phase difference between the first motor 5 and the second motor 6 is fixed. After a predetermined time period elapses, the respective rotational speeds of the first motor 5 and the second motor 6 are synchronized with each other and then reduced, so that the first motor 5 and the second motor 6 are stopped.

A result of a simulation in the torque control device according to the present invention will next be described.

Figure 4:
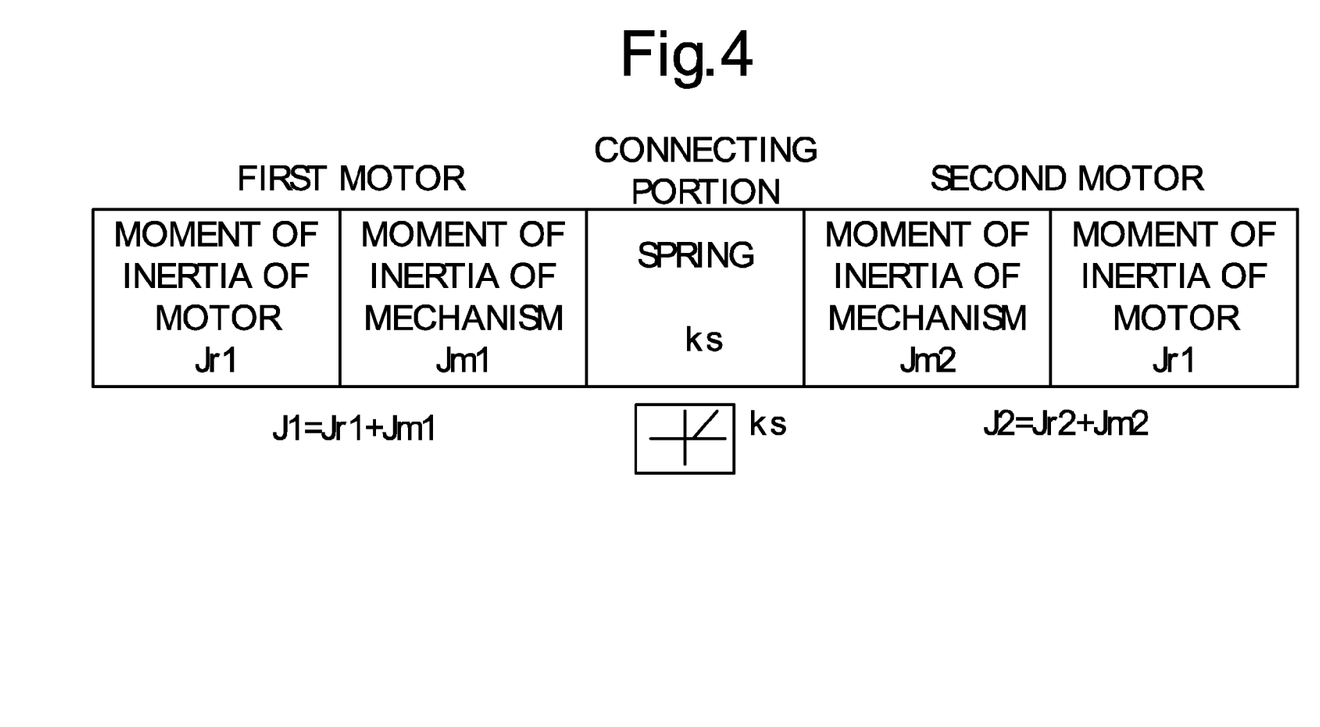
FIG. 4 is a simulation block diagram.
Figure 5:
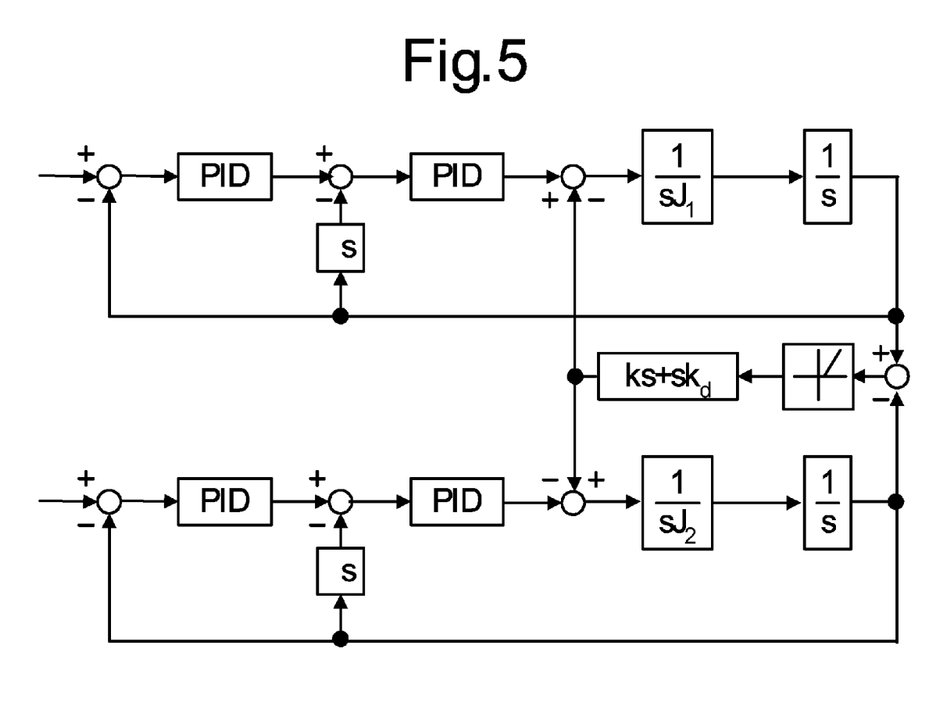
FIG. 5 is a simulation control block diagram.
Figure 6:
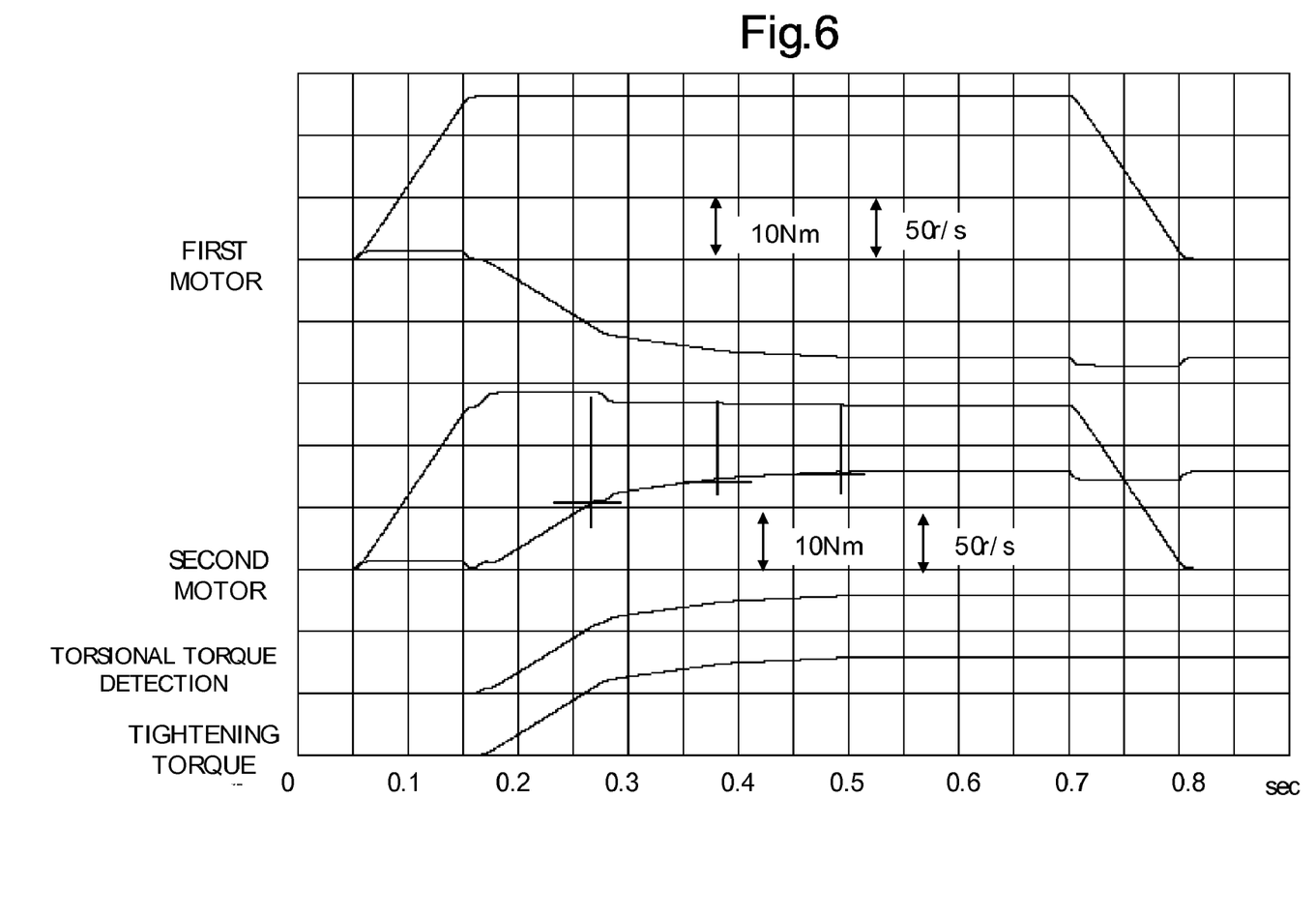
FIG. 6 shows the result of a simulation.

FIG. 4 is a simulation block diagram. FIG. 5 is a simulation control block diagram. FIG. 6 shows the result of the simulation.

Members that have a tightening torque of zero until an angle θ and have spring properties when the angle θ is exceeded are used as the connecting members 9. Moreover, it is assumed that the moment of inertia on the first motor 5 side is J1, the moment of inertia on the second motor 6 side is J2, and the spring constant of a connecting portion is Ks.

The conditions of the simulation are as follows: the position control gain Kp=200 ($s^{-1}$), the speed control proportional gain Kv=1 (Nms/r), and the speed control integral time constant Tvi=10 (ms) for each of the first motor control unit 3 and the second motor control unit 4, the first-motor-side moment-of-inertia J1=0.001 ($kgm^2$), the second-motor-side moment-of-inertia J2=0.001 ($kgm^2$), and the connecting portion spring constant Ks=10 (Nm/r). The speed profile is as follows: the first rotational speed N1=1260 (rpm), the second rotational speed N2=1386 (rpm), the third rotational speed N3=1283 (rpm), the fourth rotational speed N4=1268 (rpm), and the angular accelerations α=1320 ($rad/s^2$) and β=−1320 ($rad/s^2$). The first torque Tq1=11 (Nm), the second torque Tq2=14 (Nm), and the third torque Tq3=15 (Nm) are given.

As is clear from the result of the simulation in FIG. 6, the first motor 5 produces braking torque in reaction to torque produced by the second motor 6 and functions as an electric generator. In this case, in order to cancel driving power and generated power, direct-current power supplied to the inverter of the electrical power conversion unit 37 is common.

The detection of torsional torque will next be described.

The controller 2 receives torque references from the first motor control unit 3 and the second motor control unit 4 as response information at each control time. Thus, the inversion value of the torque reference of the first motor control unit 3 (for example, when the torque reference of the first motor control unit 3 is a negative torque reference, the inversion value represents a positive torque reference) or the torque reference of the second motor control unit 4 may be used as detected torsional torque.

Moreover, when the moment of inertia of the first motor 5 and the first mechanical unit 7 is substantially the same as the moment of inertia of the second motor 6 and the second mechanical unit 8, the respective torques of the first motor 5 and the second motor 6 during acceleration and deceleration are offset against each other by using a value obtained by subtracting the torque reference of the first motor control unit 3 from the torque reference of the second motor control unit 4 and then dividing the result by two, and thus torsional torque can be detected.

The detected torsional torque in FIG. 6 has a value obtained by subtracting the torque reference of the first motor control unit 3 from the torque reference of the second motor control unit 4 and then dividing the result by two.

When further accurate torsional torque needs to be detected, a non-contact torque sensor may be provided in the first mechanical unit 7 or the second mechanical unit 8 to directly detect torsional torque.

Figure 7:
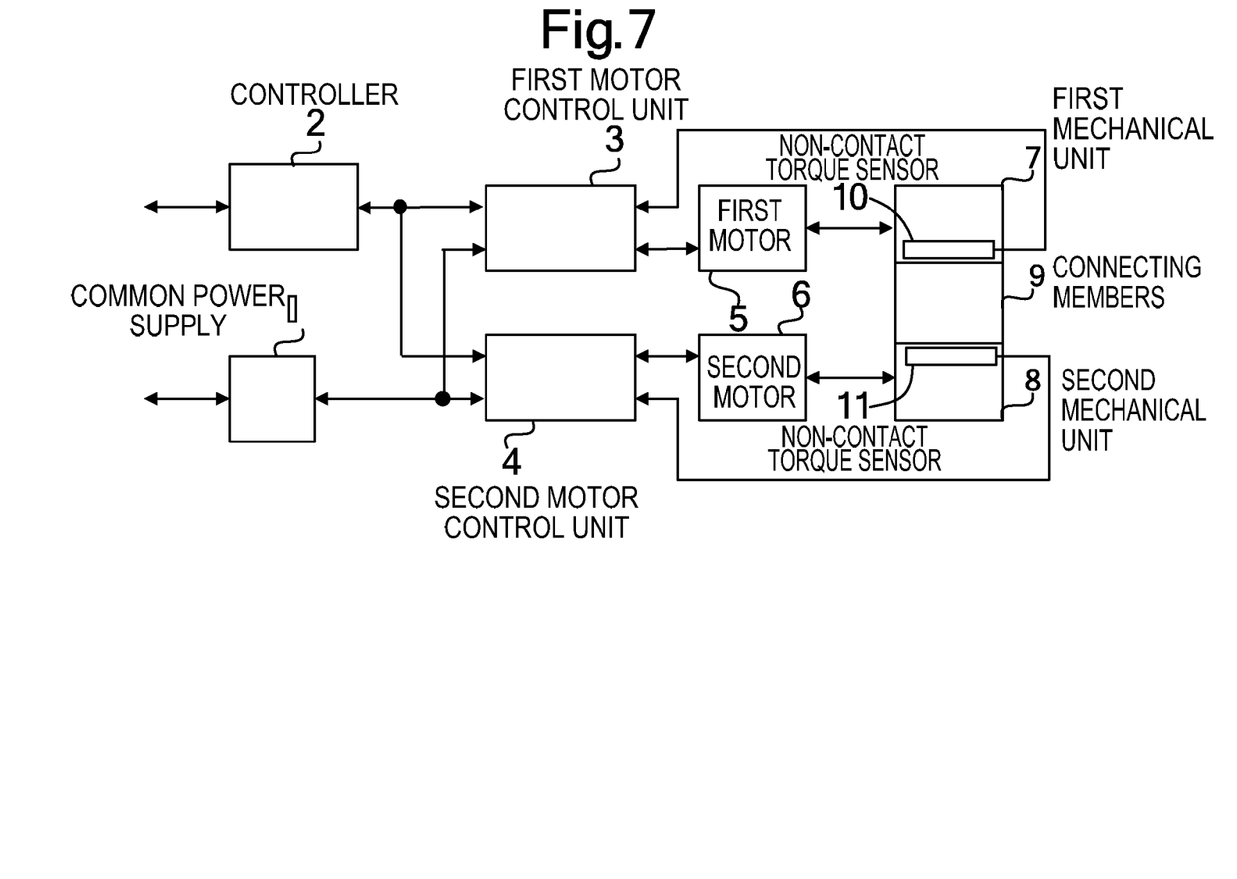
FIG. 7 is a block diagram showing another configuration of the torque control device according to the present invention.

FIG. 7 is a block diagram showing another configuration of the torque control device according to the present invention. This is an example in which a non-contact torque sensor 10 and a non-contact torque sensor 11 are respectively provided in the first mechanical unit 7 and the second mechanical unit 8. The first motor control unit 3 or the second motor control unit 4 receives a torsional torque signal and sends the torsional torque signal to the controller 2.

Methods according to the present invention for controlling a torque control device will next be described.

A method according to the present invention for controlling a torque control device performs processing in the following steps: the first motor 5 and the second motor 6 are synchronously accelerated (step 1), when the first rotational speed is reached, the rotational speed of the second motor 6 is changed according to a predetermined speed profile in which the rotational speed of the second motor 6 is higher than the first rotational speed to produce torsional torque in the connecting members 9 (step 2), when the torsional torque reaches a predetermined value, the second motor 6 is decelerated to the first rotational speed (step 3), and after a predetermined time period elapses, the first motor 5 and the second motor 6 are synchronously decelerated to be stopped (step 4).

Moreover, another method according to the present invention for controlling a torque control device performs processing in the following steps: the first motor 5 and the second motor 6 are synchronously accelerated (step 10), when the first rotational speed is reached, the rotational speed of the second motor 6 is increased to the second rotational speed, which is higher than the first rotational speed, to produce torsional torque (step 11), when the torsional torque reaches the first torque, the second motor 6 is decelerated to the third rotational speed where the first rotational speed<the third rotational speed<the second rotational speed (step 12), when the torsional torque reaches the second torque, the second motor 6 is decelerated to the fourth rotational speed where the first rotational speed<the fourth rotational speed<the third rotational speed (step 13), when the torsional torque reaches the third torque, the second motor 6 is decelerated to the first rotational speed (step 14), and after a predetermined time period elapses, the first motor 5 and the second motor 6 are synchronously decelerated to be stopped (step 15).

The torque control device and the methods for controlling the same according to the present invention can control torque even when a motor is rotating and thus can be applied to not only a screw tightening device but also a testing device, such as a motor testing device, a machine testing device, or a simulated load device.

Moreover, the torque control device according to the present invention can perform highly accurate control of torsional torque by eliminating the influence of static friction torque and setting relative rotational speed difference between connecting members to low speed, several revolutions per minute.

What is claimed is:

1. A torque control device that controls torque of a first mechanical unit and a second mechanical unit connected coaxially to each other through connecting members, the torque control device comprising:
   a controller that generates a first reference and a second reference on the basis of a command from a host system;
   a first motor that drives the first mechanical unit;
   a second motor that drives the second mechanical unit;
   a first motor control unit that controls the first motor on the basis of the first reference; and
   a second motor control unit that controls the second motor on the basis of the second reference,
   wherein the first reference and the second reference synchronously accelerate the first motor and the second motor until first rotational speed is reached, then change rotational speed of the second motor according to a predetermined speed profile in which the rotational speed of the second motor is higher than the first rotational speed to produce torsional torque in the connecting members, decelerate the second motor to the first rotational speed after the torsional torque reaches a predetermined value, and synchronously decelerate and stop the first motor and the second motor after a predetermined time period elapses.

2. The torque control device according to claim 1, wherein each of the first reference and the second reference includes a control mode reference that selects one of position control, speed control, and torque control and at least one of a position reference, a speed reference, and a torque reference.

3. The torque control device according to claim 1, wherein the first motor control unit selects one of position control, speed control, and torque control in response to a control mode reference in the first reference and drives the first motor in response to the first reference.

4. The torque control device according to claim 1, wherein the second motor control unit selects one of position control, speed control, and torque control in response to a control mode reference in the second reference and drives the second motor in response to the second reference.

5. The torque control device according to claim 1, wherein the controller detects the torsional torque, using an inversion value of a torque reference of the first motor control unit or a torque reference of the second motor control unit.

6. The torque control device according to claim 1, wherein the controller detects the torsional torque, using a value obtained by subtracting a torque reference of the first motor control unit from a torque reference of the second motor control unit and then dividing a result by two.

7. The torque control device according to claim 1, wherein the controller detects the torsional torque, using a torque sensor connected to the first mechanical unit or the second mechanical unit.

8. The torque control device according to claim 1, wherein the first motor control unit and the second motor control unit are connected to a common direct-current power supply.

9. A torque control device that controls torque of a first mechanical unit and a second mechanical unit connected coaxially to each other through connecting members, the torque control device comprising:
   a controller that generates a first reference and a second reference on the basis of a command from a host system;
   a first motor that drives the first mechanical unit;
   a second motor that drives the second mechanical unit;
   a first motor control unit that controls the first motor on the basis of the first reference; and
   a second motor control unit that controls the second motor on the basis of the second reference,
   wherein the first reference and the second reference synchronously accelerate the first motor and the second motor until first rotational speed is reached, then increase rotational speed of the second motor to second rotational speed that is higher than the first rotational speed to produce torsional torque in the connecting members, decelerate the second motor to third rotational speed that is equal to or more than the first rotational speed and less than the second rotational speed after the torsional torque reaches first torque, decelerate the second motor to fourth rotational speed that is equal to or more than the first rotational speed and less than the third rotational speed after the torsional torque reaches second torque, decelerate the second motor to the first rotational speed after the torsional torque reaches third torque, and synchronously decelerate and stop the first motor and the second motor after a predetermined time period elapses.

10. The torque control device according to claim 9, wherein the first motor control unit selects one of position control, speed control, and torque control in response to a control mode reference in the first reference and drives the first motor in response to the first reference.

11. The torque control device according to claim 9, wherein the second motor control unit selects one of position control, speed control, and torque control in response to a control mode reference in the second reference and drives the second motor in response to the second reference.

12. The torque control device according to claim 9, wherein the controller detects the torsional torque, using an inversion value of a torque reference of the first motor control unit or a torque reference of the second motor control unit.

13. The torque control device according to claim 9, wherein the controller detects the torsional torque, using a value obtained by subtracting a torque reference of the first motor control unit from a torque reference of the second motor control unit and then dividing a result by two.

14. The torque control device according to claim 9, wherein the controller detects the torsional torque, using a torque sensor connected to the first mechanical unit or the second mechanical unit.

15. A torque control device that controls torque of a first mechanical unit and a second mechanical unit connected coaxially to each other through connecting members, the torque control device comprising:

a controller that generates a first reference and a second reference on the basis of a command from a host system;

a first motor that drives the first mechanical unit;

a second motor that drives the second mechanical unit;

a first motor control unit that controls the first motor on the basis of the first reference; and a second motor control unit that controls the second motor on the basis of the second reference, wherein the first reference and the second reference synchronously accelerate the first motor and the second motor until first rotational speed is reached, then produce torsional torque by changing motor phase difference between the first motor and the second motor according to a predetermined profile by increasing rotational speed of the second motor, change the motor phase difference according to the predetermined profile after the torsional torque reaches first torque, fix the motor phase difference after the torsional torque reaches third torque, and synchronously decelerate and stop the first motor and the second motor after a predetermined time period elapses.

16. The torque control device according to claim 15, wherein the first motor control unit selects one of position control, speed control, and torque control in response to a control mode reference in the first reference and drives the first motor in response to the first reference.

17. The torque control device according to claim 15, wherein the second motor control unit selects one of position control, speed control, and torque control in response to a control mode reference in the second reference and drives the second motor in response to the second reference.

18. The torque control device according to claim 15, wherein the controller detects the torsional torque, using an inversion value of a torque reference of the first motor control unit or a torque reference of the second motor control unit.

19. The torque control device according to claim 15, wherein the controller detects the torsional torque, using a value obtained by subtracting a torque reference of the first motor control unit from a torque reference of the second motor control unit and then dividing a result by two.

20. The torque control device according to claim 15, wherein the controller detects the torsional torque, using a torque sensor connected to the first mechanical unit or the second mechanical unit.

* * * * *